US005471026A

United States Patent [19]
Ilies

[11] Patent Number: 5,471,026
[45] Date of Patent: Nov. 28, 1995

[54] CONTINUOUS RESISTANCE WELDING APPARATUS AND METHOD

[75] Inventor: Andrei N. Ilies, Chicago, Ill.

[73] Assignee: Lakewood Engineering & Manufacturing Co., Chicago, Ill.

[21] Appl. No.: 219,944

[22] Filed: Mar. 30, 1994

[51] Int. Cl.⁶ .................. B23K 11/06; B23K 11/087; B23K 11/093

[52] U.S. Cl. .................. 219/83; 219/79; 219/81

[58] Field of Search .................. 219/79, 81, 83, 219/86.41, 158, 159, 161; 228/47.1; 29/726; 890/39; 414/757

[56] References Cited

U.S. PATENT DOCUMENTS

| | | | |
|---|---|---|---|
| 3,134,012 | 5/1964 | Neukom et al. | 219/101 |
| 3,166,665 | 1/1965 | Neukom et al. | 219/104 |
| 3,167,637 | 1/1965 | Neukom et al. | 219/161 |
| 3,281,569 | 10/1966 | Bachofner | 219/84 |
| 3,562,478 | 2/1971 | Bennett et al. | 219/82 |
| 3,566,070 | 2/1971 | Plegat | 219/85 |
| 3,584,178 | 6/1971 | Huber et al. | 219/59 |
| 3,694,613 | 9/1972 | Ballard et al. | 219/101 |
| 4,144,440 | 3/1979 | Schalch et al. | 219/61.5 |
| 4,652,715 | 3/1987 | Kitamura et al. | 219/64 |
| 4,694,135 | 9/1987 | Nagel et al. | 219/110 |
| 4,785,153 | 11/1988 | Stimmel | 218/86.14 |
| 4,902,868 | 2/1990 | Slee et al. | 219/86.7 |
| 5,010,226 | 4/1991 | Sato et al. | 219/81 |

FOREIGN PATENT DOCUMENTS

| | | | |
|---|---|---|---|
| 1690615 | 6/1972 | Germany | 219/81 |
| 59-78786 | 5/1984 | Japan | 219/81 |
| 649374A5 | 5/1985 | Switzerland . | |

Primary Examiner—Teresa J. Walberg
Assistant Examiner—J. Pelham
Attorney, Agent, or Firm—Wallenstein & Wagner, Ltd.

[57] ABSTRACT

A relatively simple and inexpensive apparatus and method for providing high quality and aesthetically pleasing continuous resistance welded hollow metal articles at constant speed comprises an article workpiece conveying guide means for guiding the article workpiece through a welding means under controlled, stable, vibration free conditions in a predetermined path. The path has linear and non-linear portions. A sensor interactively connected to a programmable controller which functions to move the workpiece quickly and accurately through the welding means under stable conditions at a high uniform rate of speed. A first guide provides a weld edge reference guide, and a simple pivotal tracking system provides a weld path guide during non-linear travel of the workpiece. The tracking system exerts its force on the workpiece generally through the center of percussion of the article workpiece whereby no vibration is imparted by the force to the workpiece.

19 Claims, 2 Drawing Sheets

FIG. 3

CONTINUOUS RESISTANCE WELDING APPARATUS AND METHOD

TECHNICAL FIELD

This invention relates generally to an apparatus and method for the automatic, high speed, accurate, efficient and continuous manufacture of hollow metal articles and more particularly concerns a continuous, consistent speed resistance welding system that provides a high quality, aesthetically pleasing peripheral weld at a high rate of speed with a simple, efficient operation. A workpiece conveying means accurately guides the workpiece through a welding station. The workpiece is guided and controlled by parameter sensors interactively connected with a controller means such as a programmable logic control.

BACKGROUND OF THE INVENTION

Competitive manufacturing pressures in the fabricated metal products field require highest efficiency of operation and quality with minimum capital investment. In the manufacture of hollow metal articles such as radiator fins that must be fluid tight and of an aesthetically pleasing appearance, it has been found that a continuous weld around the periphery of the area containing the fluid is necessary to insure not only the integrity of the seal but the requisite smooth, safe and finely finished appearance. Manual welding is too inefficient, inconsistent and expensive to be a viable competitive alternative. Prior attempts with machines and methods with which applicant is aware either require compromises in efficiency and quality or are much too complicated and/or expensive to allow maximum competitive production. There is thus a need for a highly accurate, efficient, independent, relatively inexpensive apparatus and method for carrying out the welding of specific components.

Prior welding equipment and methods of which applicant has become aware include relatively complicated and expensive machines such as shown in U.S. Pat. Nos. 5,010,226; 4,902,868; 4,785,153; 4,694,135 and 4,652,715; wherein complicated and heavy robotic arms which necessitate external sources of energy to drive and compensate for the high inertial loads of the apparatus. Complicated operating procedures require higher capital expense, higher maintenance and higher operating costs than applicant considers compatible with competitive manufacturing process. Relatively simpler devices such as shown in U.S. Pat. Nos. 3,694,613; 3,566,070; 3,562,478 and 3,275,792 still include higher inertial forces and do not provide the operating speed, positive movement and weld quality applicant considers necessary to provide competitive efficiency.

The present invention is provided to solve these and other problems.

SUMMARY OF THE INVENTION

The disadvantages of the prior art are overcome by the apparatus and process of the current invention in which a relatively inexpensive, yet highly efficient welding system and method provides a continuous, constant speed resistance weld of high integrity and aesthetic appearance in a high speed, efficient operation.

An object of the invention herein is to provide an automatic resistance welding system wherein a high quality weld may be made in one continuous motion to form a plurality of pieces of metal material into an attractive and reliable product.

Another object of the present invention is to provide a low cost, mechanically simple, reliable and easily maintained apparatus and method for effecting continuous welds of high strength and attractive appearance at a high competitive efficiency.

A further object of the present invention is to provide a simple, low inertial conveying, guiding and jig means for positively controlling the movement of a workpiece as it passes through a welding station in a predetermined linear and non-linear path at a continuous, uniform rate of speed.

A still further object of the invention is to provide a lightweight, accurately driven "Smart Arm"™ workpiece guide means of low inertial mass, to contact the workpiece in a way that the vector force applied to rotate the part would pass through or close to its center of percussion and positively guide the workpiece during its movement in its non-linear path.

Another object of the invention is to provide positive and relatively vibration free movement of the workpiece during its movement through the welding point.

Yet another object is to move the workpiece during the welding operation, preferably only by means of the welding electrodes and the workpiece guide means.

Additional objects and advantages of the invention will become apparent from the following descriptions or may be acquired through practice of the invention.

The objectives of the present inventions as described herein may be achieved by the resistance welding system wherein a workpiece is positively conveyed in a predetermined linear and non-linear weld path through a weld station at a substantially continuous, uniform rate of speed.

The conveying means includes a workpiece support means on which a workpiece of multiple sections to be welded together is supported prior to, during and after welding. It further includes first and second side guide means for guiding the workpiece during its travel and a rotatable, low inertial tracking system for guiding and controlling the workpiece essentially during its non-linear path of travel through the weld station. The first or back side guide means remains in place and may serve to provide a reference surface against which the workpiece bears during movement through the weld point. During the movement of the workpiece in its non-linear weld path and portions of its linear travel, a movable second or front portion of the side guide automatically moves from a first position in which it engages the workpiece to a second position out of the plane of travel of the workpiece to allow freedom of movement of the workpiece. During portions of linear movement, the movable second or front side guide portion contacts the workpiece and may not only function to keep the workpiece sections aligned but to urge them into closer contact with each other thereby improving workpiece stability during the high speed welding and ensuring a higher quality weld. By means of these simple, lightweight easily operated and maintained elements a continuous, uniform weld of highest quality and appearance is achieved at a high rate of speed.

A plurality of sensor means feed information concerning the various operating parameters into a programmable controller which generates instructions to and controls the various components of the system to achieve maximum production efficiency and quality.

Other advantages and aspects of the invention will become apparent upon making reference to the specification, claims, and drawings to follow.

DETAILED DESCRIPTION OF THE INVENTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Figures 1, 2:
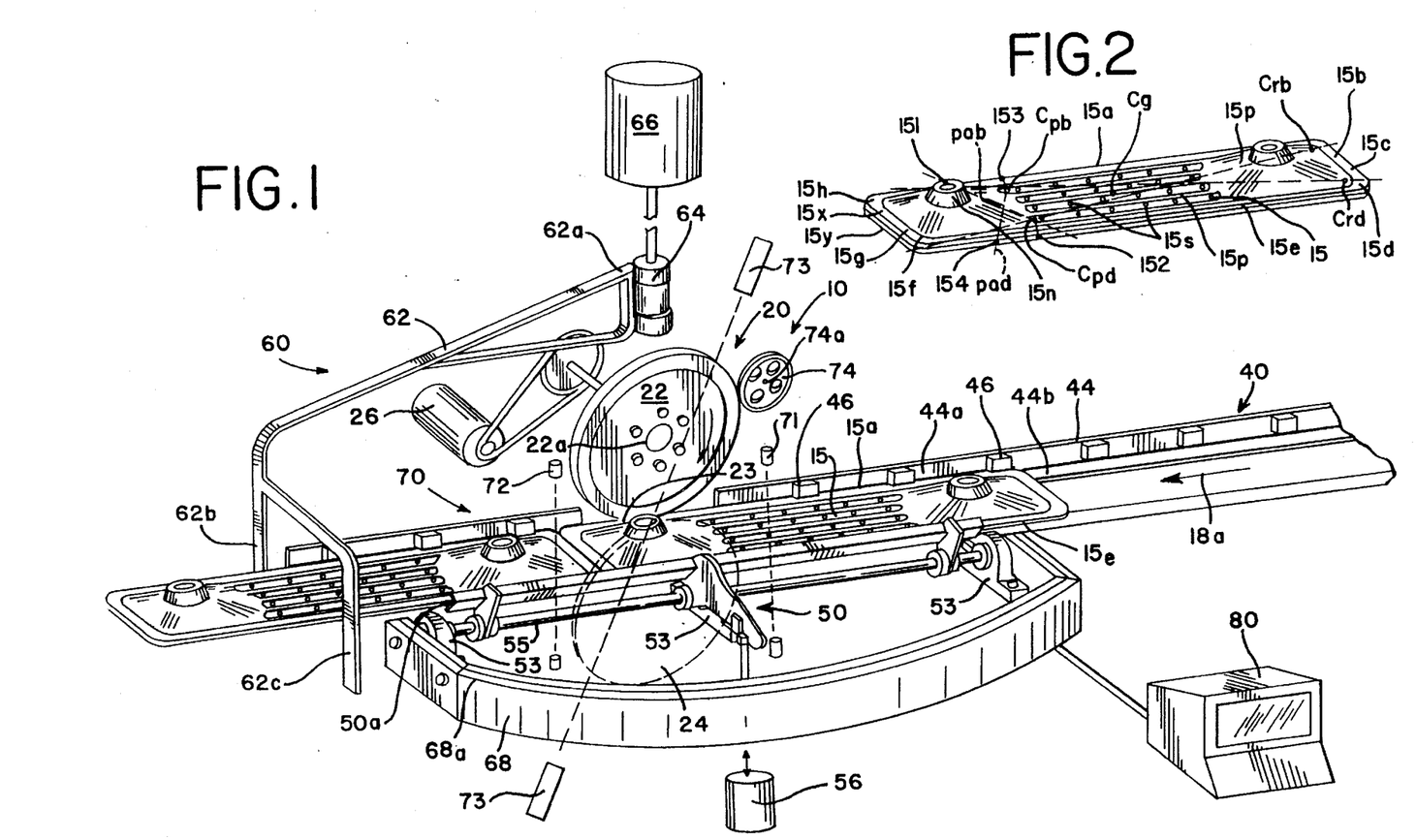
FIG. 1 is a schematic perspective view of a continuous resistance welding system according to an embodiment of the present invention.
FIG. 2 is a perspective enlarged view of the workpiece of FIG. 1.

Referring to the drawings, FIG. 1 illustrates an embodiment of a continuous resistance welding system generally indicated at 10 which has been found to produce outstanding results in the production of sealed elements such as the heater fin workpiece 15 shown.

Each heater fin workpiece 15 comprises two metal sections 15x and 15y having juxtaposed portions such as peripheral areas, 15a–h overlying each other in contacting relationship in the areas to be joined by welding. As shown in FIG. 2, the workpiece shape is rectangular with the peripheral areas including linear portions 15a, 15c, 15e and 15g and non-linear portions 15b, 15d, 15f and 15h.

The interior of the periphery of the workpiece 15 has portions 15n and 15p for example, not in contact with each other whereby when the periphery is sealed as by welding, the interior is capable of retaining fluids under sealed conditions such as would be the case with a liquid in a radiator fin.

The welding means schematically indicated at 20 may be of conventional design for seam welding machines but is shown here as comprising a pair of disc type rotational electrodes including an upper electrode generally indicated at 22 and a lower electrode generally indicated in dotted lines at 24. Each lies in the same plane and each rotates about parallel axes. In practice the electrodes 22,24 are initially apart and move toward each other to grip the portions of the workpiece 15 to be welded therebetween. By so gripping the workpiece 15, the rotation of the electrodes 22,24 serves to pull the workpiece 15 through the welding station 23. With the lightweight, well balanced workpiece 15, the electrodes preferably provide the sole propelling force for the workpiece subject only to the guiding forces a tracking system arm 62 provides to the workpiece in the way of lateral guiding and turning forces.

Although not shown, it will be understood by those skilled in the art, the upper and lower electrodes 22,24 are each electrically connected conventionally to opposite sides of an electrical power supply whereby in the preferred embodiment, for example, 17,000 amps of power are available to effect the desired approximately ¼" wide weld at a speed of about 280 inches per minute when the overlapping portions 15a–h of the approximately 0.030" thickness carbon steel sections of the workpiece 15 are moved between the abutting electrodes 22,24. At a total peripheral workpiece length of approximately 57 inches and a small time gap between each operation, the net machine production is 4 units per minute.

The upper and lower electrodes are driven by a motor means schematically illustrated at 26 and are urged into contact with a predetermined force whereby the workpiece material is gripped between the electrodes with a force that will securely move the workpiece along at the speed of the periphery of the electrode. The exact amount of force is subject to parameters such as amperage, weld width, material, coating, speed, etc. The peripheral speed is sensed by a suitable rotational sensor means 74 that bears against the periphery of electrode 22 at a point remote from the electrode contact or weld station 23. With this arrangement, the exact peripheral speed of the electrode is known and may be carefully controlled to provide a uniform peripheral speed.

Figure 3:
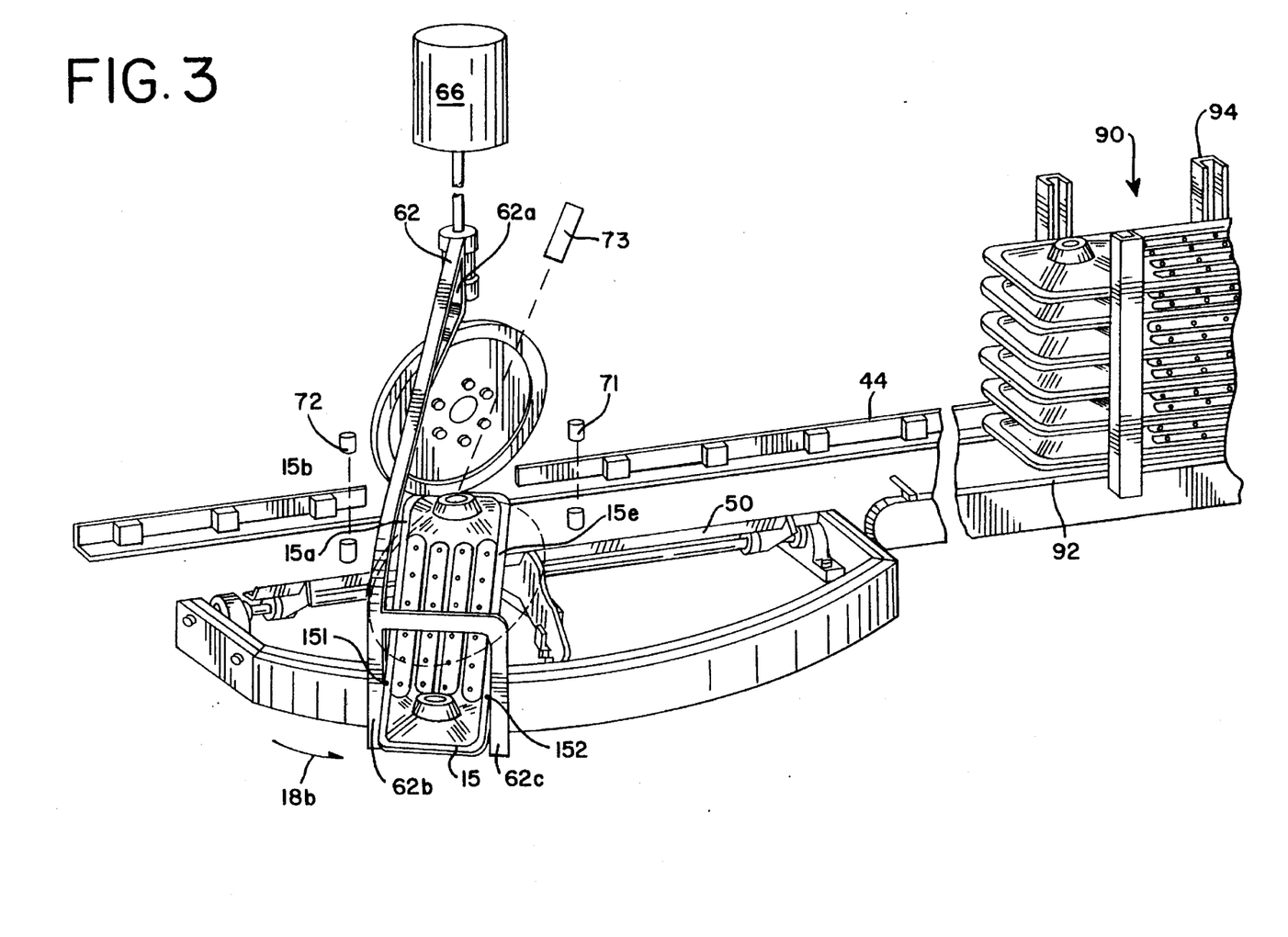
FIG. 3 is a view similar to FIG. 1 showing a workpiece being moved in a predetermined non-linear path through a welding means by a tracking system.

With multiple or half sections of the workpiece 15 arranged in abutting contact in the position in which they are to be welded together, they are moved either manually or mechanically and guided by a conveying means generally indicated at 40 along a predetermined weld path including linear components in a direction such as indicated by arrow 18a in FIG. 1 and non-linear portions in a direction such as indicated by arrow 18b in FIG. 3. The weld path 18 leads into and through the weld area or station 23 and defines the area of the workpiece receiving the weld between the multiple sections of the workpiece 15. In the manufacture of generally rectangular articles such as a heater fin shown in FIG. 2, the path 18 includes four linear segments 15a, 15c, 15e and 15g having four non-linear segments 15b, 15d, 15f and 15h therebetween.

To guide the workpiece during the linear portions 18a of its travel, the conveying guide means 40 includes a first or back side guide 44 of a linear configuration lying in a position to convey the workpiece on the proper path through the weld station 23. The back guide 44 includes an inside surface 44a that provides a guiding abutting reference edge against which the workpiece may be held as it travels in path 18 toward and into the weld station 23. The location of the surface 44a may be substantially in or slightly offset and parallel to the plane in which the electrodes lie. To urge the workpiece 15 against the surface 44a, the conveying means includes a second or front linear side guide jig means 50 positioned parallel to the first guide 44 and spaced therefrom a distance approximately equal to the width of the workpiece 15. Configuring the side guide jig means 50 in the form of an angle in the order of about 90° rotated so that the legs extend about 45° above and below the plane of the path 18 provides an inside receiving surface 50a that may not only cradle the edges of the workpiece 15 opposite to those abutting surface 44a, but may serve to urge them together and thereby help stabilize the workpiece as it moves into and through the weld station 23. This will help improve weld speed and quality.

To allow the workpiece to rotate during the non-linear travel of workpiece 15, the side guide 50 must be moved from a first position where it is adapted to be in contact with the workpiece 15 to a second position out of contact with the workpiece 15. To provide for this movement of the second side or front guide 50 between the first and second portions, the side guide 50 is mounted for pivotal movement by means such as a plurality of brackets 53 attached at one end to and extending generally at right angles to the side guide 50. A second offset portion of the bracket 53 includes a pivot means such as a rod 55 extending therethrough. The pivot means 55 runs below and parallel to the guide 50 whereby the side guide 50 may be pivoted thereabout and when it is so pivoted it will be moved out of the plane of the path 18.

A suitable controllable force exerting means such as an electric solenoid or pneumatic piston means schematically represented at 56 serves to provide the controllable force to move the second guide 50 about pivot 55 downwardly to a position below and out of the path of travel 18b as shown in FIG. 3. Return of the guide may be quickly effected by a double acting version of the force exerting means 56 or other suitable means not shown. A suitable adjustable, movement limiting means not shown may be provided for the second guide 50 to control especially its first position with respect to the contact with workpiece 15.

Further guidance of the edges of workpiece 15 may be provided by block guides 46 that may be mounted on the first side guide 44 at a position spaced above the lower guide surface 44b a distance substantially equal to the thickness of the portion of the workpiece to be welded whereby the overlying portions of the workpiece components 15x and 15y are maintained in stable contact with each other as they move rapidly toward the weld station 23. In practice it has been found that decreasing the spacing of the back guides 46 from the surface 44b very slightly as they get closer to the weld station enhances initial feeding of the workpiece and serves to urge them closer together as they approach the weld station 23. Similar guide blocks 46 on the side guide 44 positioned along the path of travel after the weld station 23 further serves to stabilize travel of the workpiece and provide positive control of the workpiece during its travels. In the manufacture of heater fins of the preferred embodiment, a weld speed of about 280" per minute is employed and hence all extraneous vibration of the two foot or longer workpiece is minimized or eliminated to provide maximum weld quality speed and appearance.

During non-linear travel 18b, the workpiece 15 is guided by a very simple but effective tracking system generally indicated at 60. The system 60 comprises an arm 62 pivotally mounted at a first end 62a on a pivotal means 64 connected to a controllable pivoting power source such as a high resolution servo motor schematically included at 66. Alternatively a step motor operating through a suitable gearing arrangement may be used. In practice we have found advantageous results are provided by a motor of five revolutions per second and a high enough resolution to allow very fine adjustment for acceleration, speed, deceleration and travel angle. Although the actual axis of rotation of arm pivot means 64 is above the electrode 22 generally, it is preferred that the imaginary axis of rotation of arm 62 is generally co-axial with or near and parallel to the axis of rotation of the workpiece 15 during the non-linear travel through the weld station 23 at an angle generally perpendicular to the plane of travel of the portions of the workpiece 15 to be welded. With this arrangement it will be understood that as the tracking arm 62 moves the workpiece in its non-linear path, the movement of the workpiece 15 will provide a smooth and even movement and maximize weld quality. Where, as shown in the preferred embodiment for example, the workpiece 15 is rectangular with quarter round circular corners, the workpiece will rotate about a single axis or center of rotation $C_r$ as shown in FIG. 2.

Actual movement of the workpiece 15 by the tracking system 60 is effected by a second end 62b– 62c of the arm 62 that is initially located straddling the path of travel 18a on the output or welded side of the weld station 23 and is movable about axis 64 in an arc of about 180°. As the workpiece enters its non-linear path of travel 18b, movement of the arm 62 by motor means 66 in response to a predetermined control means causes the second end portion 62b slideably to bear against the side of the forward end of workpiece 15 and move it away from first or back side guide 44 causing the workpiece to effectively pivot about the center of rotation $C_r$ through weld station 23 to cause the weld to follow the non-linear paths 18b. Support for the end of workpiece 15 remote from weld station 23 during its non-linear movement is provided by a turning guide means 68 having an upper surface 68a upon which the workpiece may slide. The guide 68 may be of a material such as nylon to provide a smooth, lubricant free, long lasting bearing surface.

In practice we have found more positive control during acceleration and deceleration of the workpiece is achieved by bifurcating the second end portion of arm 62 to include two portions 62b, 62c spaced apart a distance slightly greater than the width of the workpiece so that as the workpiece reaches the point in its path of travel 18a where arm 62 is to engage it, a portion of the forked arm straddles and is on either side of the workpiece 15. Thus, for example, as the workpiece reaches the end of linear segment 15a and begins the non-linear segment 15b the remote end of the workpiece such as and 15g must, be initially accelerated as it is whipped around by arm 62 to allow the uniform speed as a function of its distance from the center of rotation $C_r$, of the weld to be maintained and then just as quickly decelerated as it reaches the end of the non-linear path 15b and begins linear portion 15c. In this situation portion 62b positively engages the edge along 15a during acceleration and portion 62c provides a fail-safe means to limit any possible inertial movement of workpiece 15 during deceleration. This positive control of the workpiece and its limit of movement assure together with generally uniform acceleration and deceleration helps accurate, vibration free movement of the workpiece 15 and a consequent smooth even weld in the position 15b.

In the preferred embodiment the arm 62 is made of a heat treated aluminum to keep to a minimum its mass and resulting inertia during movement.

Another important aspect of the invention which allows increased production speeds while producing a weld of higher quality and better appearance is the design of the length of the arm 62 so that at least at the point of contact of the arm with the workpiece and during acceleration and deceleration and as long as possible therebetween depending on the path of travel, shape of the workpiece, etc., the arm is of a length such that it contacts the workpiece at a point on or near where the radius of percussion $r_p$ passes, i.e., the radius from and equal to the length from the center of rotation $C_r$ to the center of percussion $C_p$. With the arm of this length, the forces on and along the arm during substantially uniform acceleration and deceleration are of a magnitude and distribution such that there is no resultant vibration of the workpiece and the weld is effectively as smooth in the non-linear portions as it is in the linear portions. In the preferred embodiment, the axis of rotation of the arm is at or near the center of rotation of the workpiece 15 during its non-linear travel. This greatly enhances the welding speed, weld quality and the aesthetically pleasing appearance of the weld.

During linear movement of the workpiece the resultant of all the forces acting on the body passes through the center of gravity $C_g$. However, for a body that rotates about an axis of rotation that passes through a center of rotation $C_r$, the resultant of all the forces acting on it passes through a point referred to as the center of percussion $C_p$. This point $C_p$ is useful in determining resultant forces in mechanics problems involving angular acceleration and deceleration. As shown in FIG. 2, the point $C_p$ lies on a line drawn through the center of rotation and the center of gravity and may be calculated from the formula:

$$d = k_o^2 \div r$$

where d equals the distance from the center of rotation $C_r$ to the center of percussion $C_p$; $K_o$ equals the radius of gyration of the body with respect to the axis of rotation and r equals the distance from the axis or center of rotation $C_r$ to the center of gravity $C_g$ of the body. In an embodiment such as that shown for the preferred embodiment where the non-linear portion is a quarter of a circle, at the corners of a rectangle and the arm is provided about a point substantially co-axial with the center of rotation of the arm, the workpiece has a single center of rotation that is the same during each segment of non-linear travel however it will be understood that for other arm mountings or non-linear and workpiece configurations, other alternatives such as lengths based on an average or mean axis or center of rotation or multiple length arms may be used to arrive at an arm length design that will provide no or minimum vibration during uniform acceleration or deceleration of the workpiece.

From the foregoing it will be understood that as the non-linear weld is being made along portion 15b the arm portion 62b bears against edge 15a at the point 151 during acceleration of workpiece 15 as shown in FIG. 2. Point 151 is located along edge portion 15a where the edge portion 15a is intersected by a percussion center arc pad created by line $C_{rb}$–$C_{pb}$ rotated about point $C_{rb}$, while point 152 is located along edge portion 15e where it is intersected by the percussion arc pad. During deceleration, the inertia of workpiece 15 tends to cause it to bear against arm portion 62c at point 152. As the weld along port 15c occurs, the arm 62 is programmed to rotate backward through an arc the horizontal component of which is a distance equal to the length of the weld along 15c. This effectively moves the arm portion 62b to bear against workpiece 15 point 153. At the same time, however, the center of rotation for the next non-linear weld portion 15d has moved to position $C_{rd}$ such that the arm portion 62b is on the point 153 which is on a percussion arc pad created by line $C_{rd}$–$C_{pd}$ rotated about $C_{rd}$. Point 154 is on the opposite side at the intersection of side portion 15e with arc pad. Thus, when portion 62b accelerates the workpiece during the initial weld along portion 15d and portion 62c bears against 154 during deceleration as that weld is being completed, the portions 62b and 62c respectively are on an arc passing through the center of percussion. From the foregoing it will be understood that the optimum length of arm bearing against the workpiece 15 during both the substantially uniform acceleration and deceleration of workpiece portions away from the weld area during each of the four non-linear welds eliminates vibration caused by unbalanced forces and produces a smoother, better looking and higher quality weld at a higher rate of speed than was previously possible. Elimination of the vibration due to inertia forces also reduces wear on the apparatus.

A sensing means generally and collectively indicated at 70 includes a plurality of components that monitor the various aspects of the apparatus and process. Thus, for example the presence, position and/or speed of the workpiece 15 as it moves along path 18 may be sensed by first, second and third sensors 71,72 and 73, respectively, which may be of any suitable type such as an optical photoelectric sensor. The first sensing means 71, located just before the outer radius of the welding electrodes 22,24, senses the pressure of the leading edge portion 15g of the work piece 15 as it moves toward the weld station 23. This signal is fed to a controller means schematically shown at 80 which is programmed so that when said first sensor detects the pressure of a workpiece it causes the second or front side guide means 50 to raise to its first position in contact with the workpiece 15 to align it against guide means 44 and surface 44a. At this point according to the preferred embodiment the welding electrodes 22,24 will be apart and the newly entering workpiece 15 will be contacting the prior welded workpiece to begin pushing it out of position. The abutting workpieces move along pushed by mechanical or manual workpiece feed means until the second sensing means 72 positioned on the opposite side of the electrodes 22,24 from the first sensing means 71 detects the gap between the two abutting workpieces caused by the gaps created by rounded edges portions 15b,15h between the straight portions 15a.

The signal from the second sensing means 72 initiates the beginning of the welding cycle for the new workpiece. Thus, the electrodes 22,24 are caused to come together in pressure contact with the workpiece 15, the wheels 22,24 begin rotating and the welding of the workpiece at point 23 begins. The workpiece 15 is moved along at this point solely by the electrodes gripping it. As the rear edge 15c passes the first sensor 71, the guide 50 is caused to drop down in preparation for the non-linear motion of the workpiece.

After this point a third sensing means 73, located to detect the presence or absence of the workpiece just before the weld station 23, schematically shown in FIG. 1 as an optical photoelectric means having a beam of light between a light source and a light sensor, detects the rear edge of the workpiece 15 and through controller 80 triggers the predetermined movement of guide arm 62 by motor 66 approximately 90° to rotate the workpiece 15 about a center of rotation $C_{rb}$ as previously described whereby the weld is caused to follow a non-linear path 18b as shown in FIG. 3 around the workpiece portion 15b. When the linear portion 15c is reached, the guide arm 62 reverses its rotation to accommodate the movement of the weld means along portion 15c without any interference so there is no stress on the weld. Then as the weld continues the third sensing means 73 detects the end of portion 15c and at the beginning of non-linear portion 15d the guide arm 62 is programmed to continue rotating the workpiece 15 approximately another 90° to bring the linear portion 15e against guide 44. First sensing means 71 is positioned so that it is outside the periphery of the workpiece during the welding of portions 15b,15c and 15d, however, as the portion 15e comes close to guide 44, it is detected and the second side guide 50 moves up again to its first position in contact this time with portion 15a. Again, as the edge 15g passes the first sensor 71 the side guide 50 again is retracted in preparation for the non-linear movement around portions 15f and 15h. The welding of portions 15f, 15g and 15h and the completion of 15a follows in the same manner as described with respect to portions 15a, 15b, 15c, 15d and 15e except that as the end portion 15g is detected by the second sensor 72, it starts a timer that stops the welding means after a short weld overlap and the electrodes release and move away from each other so the next piece may push out the completed workpiece seriatim. To assure a complete weld, an overlap of about one quarter to three eights of an inch is provided for. The speed of the periphery of the electrode 22 may be monitored by a rotary encoder 74 having an axis of rotation 74a parallel to the axis of rotation 22a of electrode 22. The movement of the tracking system arm 62 is precisely controlled by the controller for the motor means 66. Of course the welding means 20 includes indicators for all welding parameters as will be known to those skilled in the art.

Signals generated by the various components of the sensing means 70 are fed by suitable means understood by those skilled in the art to a controller means substantially represented at 80. The controller means 80, in accordance with the preferred embodiment, is a programmable controller that receives the signals of the various operating parameters and generates instructions in accordance with predetermined input to control the operations of each of the various components of the continuous welding system 10 to produce the desired finished product with the desired quality and speed.

Operation of the continuous resistance welding system 10 includes the steps of assembling a workpiece 15 comprising a pair of generally rectangular metal halves having the peripheral edge portions 15a–h to be welded together lying in contact with each other and properly aligned; positioning a lower side of the assembled workpiece 15 in a supported position on a conveying means 44,50 with edge 15a firmly abutted against guide surface 44a and edge 15c slideably but firmly in the groove 50a; initiating movement of the workpiece 15 by a manual or mechanical external force in a direction of movement 18a until the leading portion of edge 15a is detected by the second sensing means 72; moving the electrode rollers 22,24 together to grip the workpiece; beginning rotation of the rollers 22,24; beginning welding in the weld station 23; drawing the workpiece 15 along in the grip of the electrodes 22,24 until the first linear segment of travel on path 18a is completed as detected by the third sensing means 73; guiding the workpiece 15 in its non-linear path portion 18b by rotating tracking arm 62 to engage arm portion 62b against welded edge 15a at a point 151 where the arc of percussion intersects it such that substantially all of the forces entered against the workpiece by the arm pass through the center of percussion of the workpiece to cause the workpiece to rotate through acceleration and deceleration about its center of rotation in a substantially vibration free manner as it moves in the non-linear path portion 18b to effect the welding at point 23 along non-linear portions 15b; drawing workpiece edge portion 15c against guide surface 44a by means of the electrodes 22,24 to cause it to travel along path 18a, accommodating such movement during welding along portion 15c with a small rearward return movement of arm 62b and then continuing the forward movement of arm 62 to move the workpiece 15 through non-linear path 18b as it completes the weld of portion 15d and brings side 15e into engagement with guide surface 44a. At this point arm 62 is driven by servo motor 66 to return quickly to its initial position to await completion of weld area 15e after which the rotational movement of arm 62 is repeated for weld portions 15f, 15a and 15h to complete the continuous weld in one smooth vibration free, uninterrupted motion at a constant speed from beginning to end.

Guide means 50 is moved out of its first guiding position during the welding of portions 15b, 15c and 15d however it is returned into the first position to engage and guide welding edge 15a during the welding of edge 15e.

In the practice of making heater fins as shown in FIG. 2 the multiple sections 15x and 15y of the workpiece 15 may be previously suitably secured together as by spot welding at various locations 15s in the interior of the workpiece to hold the sections 15x,15y together before they are welded about their periphery in the apparatus 10.

It is an important aspect of this invention that vibrations in the welding area due to high speed rotation of the portions of workpiece 15 remote from the center of rotation near the weld area during non-linear travel is reduced to substantially zero by having the arm 62 engage the workpiece so the forces, including acceleration and deceleration, pass through the center of percussion $C_p$ of the workpiece 15. With the arm having a fork-like end portion 62b, 62c, the portion 62b engages the workpiece during acceleration while the portion 62c engages the workpiece during deceleration or when it would tend to get away from 62b for any reason. This allows smooth acceleration and deceleration and increases the arcuate control of the dynamics of the weld. With this system of positive, control of the part, welds of 300 inches per minute and more are possible on relatively light workpieces without compromising quality. In practice we have run production speeds of four parts per minute with parts having about sixty inches of weld. While the workpiece may be fed by manual or mechanical means we have found an automatic mechanical feed schematically indicated at 90 including feed means 92 such as a chain drive means, feeds workpieces into the apparatus quickly and smoothly as quickly as possibly by using a new unwelded workpiece 15 to push a workpiece in which the weld is completed out of the apparatus welding area and positioning the new piece at a point where the weld may be initiated. A suitable stacking feed magazine 94 positions the workpiece for engagement by the feed means 92.

In addition to greatly improved quality, the manufacturing speed made possible by the apparatus according to the invention is many times the speed of machines using prior art methods known to applicant. This increased speed reduces the required investment in machines, workspace and manpower for the same production output.

Although the preferred embodiment of the apparatus and process include a workpiece 15 moving in a single two dimensional plane and provide welds along parallel linear edge areas and generally circular non-linear edge areas, the concepts and principles of the invention are capable of movement in other circuitous paths.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A welding system comprising:

a welding station including a welding means positioned at a weld position point for continuously welding along superimposed and aligned predetermined marginal portions of aligned superimposed workpiece sections and means for conveying these superimposed workpiece sections to be welded past said weld position point, said marginal portions of each workpiece section to be welded including at least a pair of straight marginal portions interconnected by at least one rounded corner;

guide apparatus including first guide wall means for guiding said straight superimposed marginal portions of the superimposed workpiece sections to be welded, sliding therealong and aligned with each other, along a straight predetermined longitudinally extending path of travel and into and through the weld position point and a workpiece-rotating tracking system for guiding the aligned rounded corners of the superimposed workpiece sections through said weld position point by rotating the superimposed sections so that the welding means welds said superimposed rounded corners together, said tracking system including an arm having an inner end located near said weld position point and pivoted about an axis extending through or near the center point of the superimposed aligned curved corners to be welded, and an outer end positioned for engaging the outer leading already welded edges of said first pair of straight marginal portions of the workpiece sections being welded, to cause the outer end of said arm to push against the same to rotate the workpiece sections inwardly about said axis so that said superimposed rounded corners are slidably pivoted against said first guide wall means near said weld position point where they are welded by said welding means, said outer end of said arm being bifurcated to produce a first portion adapted to engage the superimposed straight marginal portions of the superimposed workpieces as described, and a second portion which is located adjacent the opposite side of the superimposed workpiece sections to prevent overshoot of the superimposed workpiece sections upon termination of the welding of the first rounded corners to be welded of said superimposed workpiece sections;

a sensing system including at least first sensing means responsive to the completion of a welding together of said first of said pair of straight marginal portions by generating a control signal; and a controller means interactively connected with said workpiece-rotating tracking system and said first sensor means for initiating rotation of said pivoted arm to cause said arm to rotate inwardly about said pivot axis, to rotate the superimposed workpiece sections so that said rounded corners are moved past said weld position point, and for terminating rotation thereof by completion of the welding of the superimposed rounded corners, whereby the next straight marginal portions of the superimposed workpiece section can then be welded as they are guided by said guide wall means past said weld position point.

2. The welding system according to claim 1 wherein said guide wall means include laterally spaced first and second guiding wall sections adapted to hold said workpiece sections in superimposed contact with each other during welding of the straight marginal portions of the workpiece sections.

3. The welding system according to claim 1 wherein said outer end of said pivoted arm of the tracking system contacts said workpiece at a point such that the majority of the contacting force passes through or near the center of percussion of the workpiece sections and thereby produces relatively vibration free movement of the workpiece sections.

4. The welding system according to claim 3 wherein said superimposed workpiece sections have opposite sides; a center of rotation $C_r$; a center of percussion $C_p$; and a percussion center art, said percussion center arc being defined by the line $C_r$–$C_p$ rotated about $C_r$, said arc intersecting said opposite sides of said workpiece sections at first and second points; said first portion of said means for contacting said workpiece contacting said first point and said second portion of said means for contacting said workpiece sections are moved quickly and smoothly with no vibration caused by unbalanced forces so that a smooth and quality weld is produced at a high rate of speed.

5. The welding system according to claim 1 wherein said tracking system further includes a turning guide means adapted to support said superimposed workpiece sections during their rotational movement, said turning guide means having upper edge means lying in a plane beneath the superimposed workpiece sections.

6. The resistance welding system according to claim 1 wherein said pivoted arm of the tracking system is connected to a controllable pivoting power source, said outer end of said arm adapted to slidingly engage said workpiece sections after it has moved through said welding means.

7. The welding system according to claim 1 wherein said controller means is a programmable controller that receives the sensed signals and generates instructions in accordance with predetermined input to control the operations of said welding and tracking system.

8. The welding system of claim 1 wherein said arm pivots in a reverse or outward direction after its initial inward pivotal movement to enable the welding means to weld around a curved corner or marginal portion of the superimposed workpiece sections so that the next aligned initially transversely extending straight marginal edge portion of the superimposed workpiece sections can be moved in a linear path past said welding means.

9. The welding system of claim 8 wherein after completion of the welding of the latter straight marginal edge portions there is rendered active an arm driving means for pivoting the arm inwardly again to bring the next aligned curved corner or marginal portions of the superimposed workpiece sections past said welding means.

10. A welding system comprising:

a resistance station including welding means positioned at a welding point for continuously welding along predetermined straight and curved aligned marginal portions of superimposed and aligned workpiece sections and means for conveying the superimposed workpiece sections past said point, said superimposed workpiece sections to be welded having aligned opposite straight parallel marginal portions, at least one aligned pair of which are to be welded and a straight marginal portion extending transversely between said opposite straight parallel portions, said curved marginal portions interconnecting the ends of said transversely extending straight marginal portion with said opposite straight parallel marginal portions of said superimposed workpiece sections;

guide apparatus and workpiece-rotating apparatus for respectively guiding the straight and curved aligned marginal portions of said workpiece sections along predetermined paths of travel including a linear path for welding said superimposed straight marginal portions and a non-linear path for welding said superimposed curved marginal portions of the superimposed workpiece sections, said paths passing through said weld position point of said welding means, said guide apparatus including first and second side guide means positioned respectively to engage said opposite straight parallel marginal portions of the superimposed workpiece sections, to hold said workpiece sections in superimposed contact with each other during welding of the straight marginal portions, said second side guide means being v-shaped to apply a clamping together force on the outer opposite straight parallel marginal portions of the superimposed workpiece sections as the innermost ends of same are being moved past said welding point and to push the latter marginal portions against said first side guide means to guide the workpiece sections slidably engaging the same, said second guide means adapted to be moved into and out of engagement with the adjacent straight marginal portions of the superimposed workpiece sections as required to allow said portions thereof to be welded to travel said predetermined path, and said workpiece rotating apparatus being adapted to rotate said superimposed workpiece sections so that the curved marginal portions thereof are moved past said weld position point;

sensing means for sensing the passage of the leading edges of superimposed workpiece sections approaching said welding means for moving said second side guide means against the outer straight marginal portions thereof to push the same against said first guide means to stabilize the position of the workpiece sections fed by said welding means, and, upon termination of the welding of straight marginal portions of said workpiece sections, for moving said second side guide means away therefrom to permit rotation of said workpiece sections.

11. The welding system according to claim 1 or 10 wherein said pivoted arm is pivoted about an axis above and generally perpendicular to the point near which the weld occurs.

12. The welding system according to claim 1 or 10 wherein said welding means includes a pair of driven rotating electrodes adapted to grip opposite sides of said workpiece sections therebetween under pressure and move it.

13. A welding system comprising:

a welding station including welding means positioned at a weld position point for continuously welding along superimposed and aligned predetermined marginal portions of superimposed workpiece sections and means for conveying the superimposed workpiece sections past said point;

guide apparatus and workpiece-rotating apparatus respectively including guide wall means for guiding the portion of said superimposed workpiece sections to be welded along a predetermined linear path through the weld position point of said welding means and a workpiece-rotating tracking system for guiding said superimposed workpiece sections to be welded along a non-linear path of travel through said weld position point;

sensing means for sensing the operating parameters of said system including the presence or absence of said superimposed workpiece sections as they move in said linear path and for producing suitable signals indicative of said parameters, and said sends means including first, second and third sensor means adapted to signal the presence and/or absence of said superimposed workpiece sections at various locations as they move along said path into and through said welding means, said first sensor means being located to detect the presence or absence of a pair of superimposed workpieces in points where a movable guide means can be moved thereagainst to stabilize the lateral position thereof and points where said movable guide means can be moved away from the superimposed workpieces to release the same therefrom so that said tracking system can move the superimposed workpieces in a non-linear path; said second sensor means being located to detect the position of said workpieces at a point where welding is to begin, and said third sensor means being located to detect the position of said superimposed workpiece section at a point where said tracking system is to be operative to move said superimposed pieces in a non-linear path; and a controller means interactively connected with said welding means, a tracking system and said sensing means to control the operations of said welding means and tracking system to move said workpiece at a rate of speed along said path into and through said welding means to complete a continuous weld.

14. The welding system according to claim 13 wherein said sensing means include a fourth sensor adapted to sense the speed of said welding means.

15. The welding system according to claim 13 wherein said guide wall means including a first stationary side guide wall section and a second side guide wall section spaced therefrom, said second guide wall section is movable between a first position adapted to contact and guide a pair of superimposed workpiece sections in a linear direction and a second position out of contact with said superimposed workpieces, said second side guide means being adapted to move to said first position during the period said first sensor means detects the presence of said workpiece sections and to move to said second position when it senses the absence of said workpiece sections, said welding means being activated by said second sensor means upon the initial detection of the presences of said workpiece sections, said welding means being maintained in active welding operation while the presence of said workpiece sections is detected by said third sensor means and until a short delay period after said second sensor means detects the leading edge of said workpiece sections upon completion of the movement of said workpiece sections in said predetermined path; said workpiece sections being caused to move in said non-linear path by said tracking system when said third sensor means detects the absence of said workpiece sections after completion of said weld on each of said linear portions thereof.

16. A method of automatically welding a plurality of pairs of superimposed aligned workpiece sections each having a center of percussion and aligned longitudinal edges terminating at one end in one or more aligned, partially circular corners or margins, said workpiece sections to be welded at least along one of the aligned longitudinal edges thereof and the aligned partially curved corner or margin at the end of said aligned longitudinal edges, said method comprising the steps of:

conveying the aligned longitudinal edges to be welded of each pair of superimposed workpiece sections through welding means at a welding station;

arranging said pairs of superimposed workpieces fed to said station so that, upon termination of the welding of said sections along aligned longitudinal edges of a pair of superimposed workpiece sections, the superimposed workpiece sections are arranged to be pivotally mounted next to said welding means at said one end about an axis at the center of the partially circular corner or margins to be welded; and exerting a force against one of the aligned longitudinal edges of the pair of workpiece sections involved at a point where the center of percussion arc intersects the same such that the forces are, in effect, exerted at or near the center of percussion of the superimposed workpiece sections being welded, so that the workpiece sections are pivoted with minimum vibration about said axis to move the aligned partially circular corners or margins being welded through said welding means.

17. The method of claim 16 wherein said welding means rotates so that said workpiece sections are gripped by and during welding of the longitudinal edges are moved along only by the workpiece rotating force exerted on said longitudinal edges by the rotating welding means.

18. The method according to claim 16 wherein after the weld is completed on a first pair of superimposed workpiece sections, a second pair of superimposed workpiece sections contacts said first pair of workpiece sections to push them out of the welding station and replaces them after which the steps are repeated for the next pair of superimposed workpiece sections.

19. A method of continuously welding aligned, superimposed workpiece sections, said workpiece sections having initially aligned pairs of longitudinally and transversely extending linear marginal edge portions and non-linear marginal bridging edge portions interconnecting the adjacent ends of said linear marginal edge portions, said method comprising the steps of:

assembling in superimposed relation a plurality of workpiece sections with said pairs of marginal edge portions thereof to be welded together in alignment and lying in contact with each other;

positioning said superimposed assembled workpiece section on a conveying means with a first pair of initially aligned longitudinally extending marginal edge portions of said superimposed workpiece sections abutted against a first longitudinally extending guide wall means and a second opposite longitudinal marginal edge portion thereof slidably received in a second longitudinally extending guide wall means;

guiding said pairs of workpiece sections in a longitudinal linear path between said first and second guide means into the nip of a pair of rotating weld rollers, drawing the workpiece sections by means of said pair of rotating weld rollers through welding points along the length of one of the first initially aligned longitudinal marginal edge portion of the superimposed workpiece sections;

removing said second guide wall means from contact with and location near said workpiece sections, and moving said superimposed workpiece sections in a non-linear path by exerting a lateral force against said aligned first pair of longitudinal marginal edge portions of said workpiece section at or near the point of intersection thereof of the center of percussion arc.

* * * * *